United States Patent Office 3,605,571
Patented Sept. 20, 1971

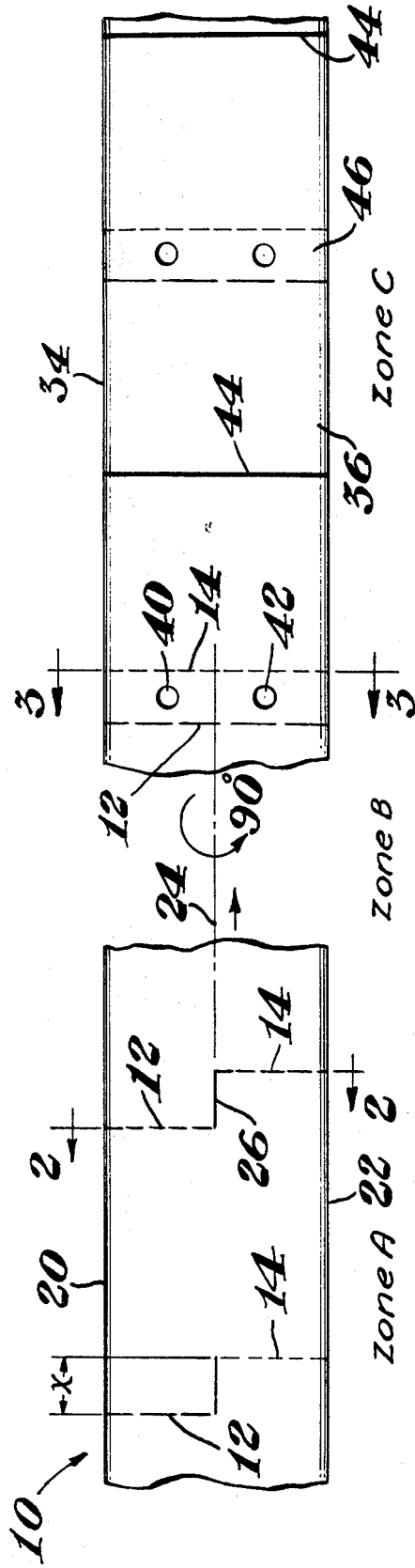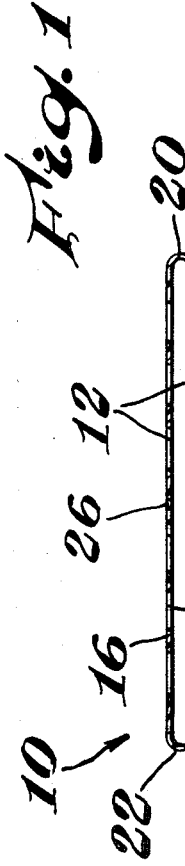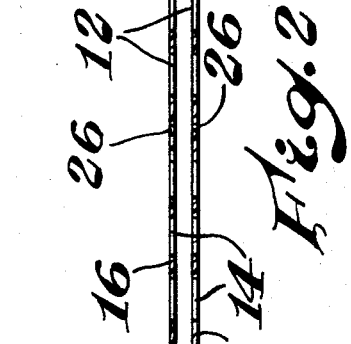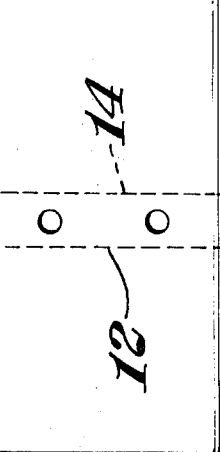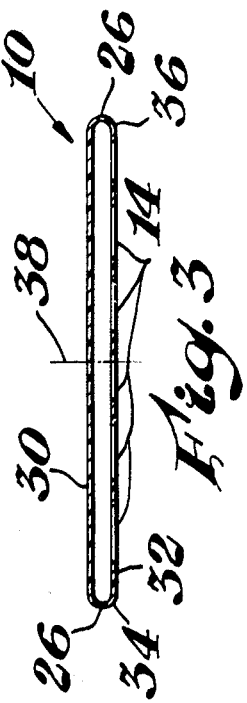

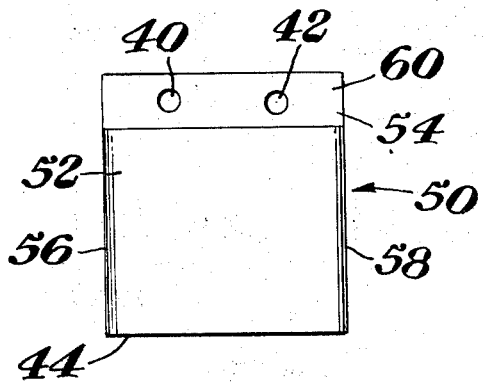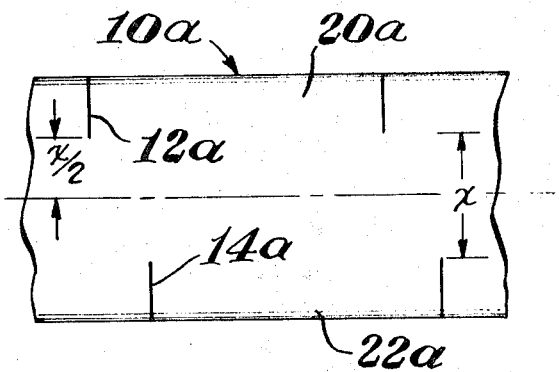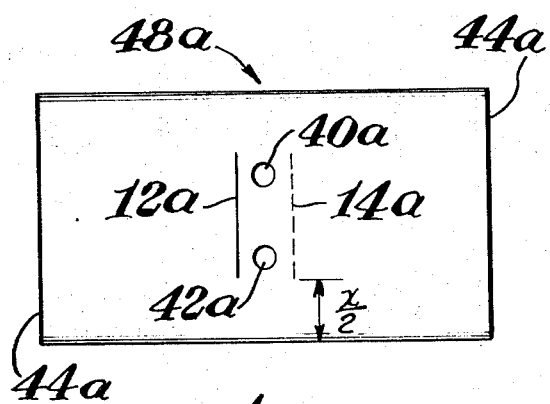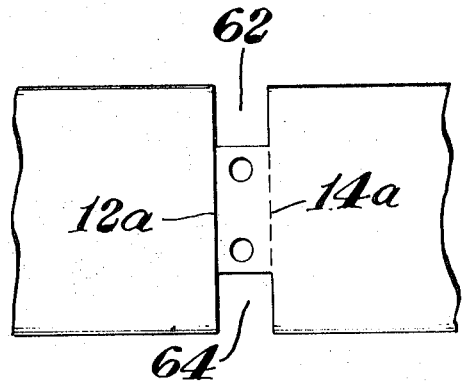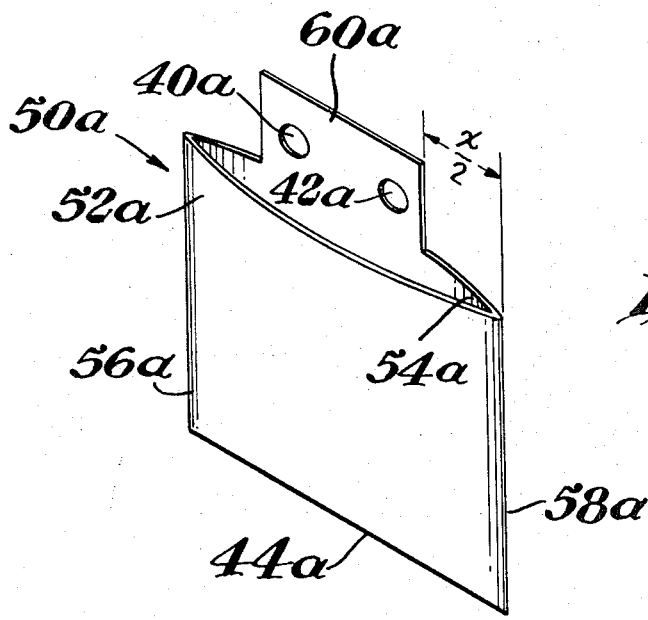

3,605,571
PROCESS FOR MANUFACTURING LIP BAGS
Oliver R. Titchenal, Berea, Ohio, assignor to The Dow Chemical Company, Midland, Mich.
Filed Mar. 2, 1970, Ser. No. 15,453
Int. Cl. B31b 49/04
U.S. Cl. 93—35R                        10 Claims

ABSTRACT OF THE DISCLOSURE

A process for manufacturing lip bags from continuous lengths of flattened tubular film is disclosed. Exemplary of the process is where the film is perforated along first and second offset lines extending inwardly from opposite edges of the film, and which terminate at the film center line. In addition, a cut is made along the center line in the region between the offset lines. The film is then rotated or displaced 90 degrees such that the perforation lines now reside on opposed faces of the film, respectively, and the cuts are now located along the film edges. Cross-seals are subsequently formed, and the film separated into parts such as by tearing along the perforations. Each such part comprises a bag having an offset lip portion and a bottom end closed by the indicated cross-seal. The process is essentially scrapless and desirably permits the continuous manufacture of lip bags.

BACKGROUND OF THE INVENTION

Field of the invention

The present invention relates to an improved process for manufacturing lip bags from continuous lengths tubular material such as tubularly extruded polymeric film. More particularly, the invention relates to such a process which is essentially scrapless, and yet desirably permits lip bags to be manufactured on a continuous basis.

DISCUSSION OF THE PRIOR ART

Lip bags are commonly manufactured today from J-folding web stock. The stock after folding can be intermittently cross-sealed, for example, whereby the same is compartmented into a plurality of connected bag elements each including an offset lip portion. The bags are then separated such as by cutting the same apart along the indicated sealed areas between adjacent bags. Alternately, the bags can be cross-sealed by a heated cutting tool which simultaneously seals and cuts the bags apart from each other.

In addition, the prior art has suggested the desirability of manufacturing lip bags from continuous lengths of tubular film. Bags manufactured by this latter method, for example, can be gusseted along both sides of the bag and, therefore, are more adaptable to packaging bulky items. Bags formed from web stock, however, are necessarily limited to a bottom-gusset only. Moreover, the manufacturing of lip bags from web stock requires that the bag seams be located adjacent each side of the mouth of the bag. Such seams are normally the weakest part of the bag structure and have been known to "zipper tear" when the bag mouth is opened, for example, by automatic machinery for inserting a product into the bag.

Nevertheless, prior art tubular stock forming methods oftentimes have the disadvantage that the same require considerable loss of material or scrap in forming the bag. For example, in one such prior art process disclosed in U.S. Pat. No. 3,334,552, the film is flattened and relatively wide notches cut through both layers of the film. The notched area extends from one edge of the film inwardly to the film center line. The film is then rotated 90 degrees such that the notch now forms a square cutout on one face of the film which extends completely across the width thereof. In other words, the area of the cutout defines a single layer of film which can be subsequently cut along its mid-region to separate the film into two parts, each including an offset lip portion. The extent of the lip portion is commensurate with the width of the film, and is offset a distance equal to one-half the width of the cutout. Resultant scrap material is thus equal to one-half the amount of material in the lip portion of each bag so manufactured.

It is an object of the present invention, therefore, to provide a process for manufacturing lip bags from continuous lengths of tubular film material wherein minimum or no scrap material is generated.

A further object is to provide such a process that permits lip bags to be manufactured continuously.

BRIEF SUMMARY OF THE INVENTION

Briefly then, the present invention contemplates a scrapless process for manufacturing lip bags from tubular film. In practicing the invention, the film is perforated and/or cut at strategic regions, but at least one region of the film is left intact. The bags thus remain integrally connected for subsequent processing on a continuous basis. As an example, flattened tubular film can be perforated (or cut) along first and second offset lines extending inwardly from opposite edges of the film, and which terminate approximately adjacent the film center line. In addition, the center line is cut (or perforated) in the region between the first and second offset lines. The indicated cuts and/or perforations extend through both layers of the flattened film. The film is subsequently rotated or otherwise displaced 90 degrees, whereby the perforation lines now reside on opposed film layers, respectively, and the cuts reside along the edges of the film. The film can then be cross-sealed at locations remote from and on each side of the perforation lines, and the film separated into parts such as by tearing along the perforations. Each such part comprises a lip bag. Various modifications to the present invention contemplate, for example, elimination of the need for cutting or perforating along the center line of the film, but include the additional step of cutting the bags apart from each other as opposed to tearing the same apart.

The preferred embodiments of the present invention are shown in the accompanying drawings wherein wheresoever possible like reference numerals designate corresponding materials and parts throughout the several views thereof in which:

FIG. 1 is a diagrammatic and schematic illustration of a scrapless process for manufacturing lip bags from tubular material;

FIGS. 2 and 3 are cross-sectional views taken on FIG. 1 along reference lines 2—2 and 3—3 thereof, respectively;

FIG. 4 shows an intermediate stage in manufacturing lip bags according to the process of FIG. 1;

FIG. 5 shows separately the resultant lip bag obtained by manufacturing the same in accordance with the process shown in FIG. 1;

FIG. 6 illustrates a first step in manufacturing lip bags according to a modified form of the invention;

FIGS. 7 and 8 show successive intermediate stages, respectively, in manufacturing lip bags according to the modified process of FIG. 6; and FIG. 9 is a view like FIG. 5 only showing the resultant lip bag structure obtained by the modified manufacturing process of FIG. 6.

DESCRIPTION OF THE PREFERRED EMBODIMENTS

Looking now more particularly at the drawings, there is shown in FIG. 1 a process for manufacturing lip bags from a continuous length of film 10. Film 10 can be fed, for example, from roll stock (not shown) and first received at a zone A where it is strategically cut, perforated or otherwise weakened such that it can be subsequently separated along certain desired lines, as will be explained more fully hereinafter.

For example, at zone A, first and second lines of weakness or perforations 12 and 14 are cut through both layers 16 and 18 of film 10 (see FIG. 2). Lines 12 and 14 extend, for example, from an area adjacent the opposite edges 20 and 22 of the film approximately to the film center line, as is denoted by imaginary line 24. In addition, a cut 26 is made through layers 16 and 18, and is located along center line 24 in the region between first and second lines of perforation 12 and 14.

Film 10 is then directed forward to a zone B where it is rotated clockwise or otherwise displaced an angular distance of 90 degrees. Most desirably, such angular displacement of the film is effected, for example, by feeding the film through spaced apart sets of nip rolls (not shown) disposed at right angles to each other. Such a technique for displacing the tubular film an angular amount of 90 degrees is shown, for example, in some detail in U.S. Pat. No. 3,334,552.

Film 10 next enters a zone C in condition where perforation line 12 now resides entirely on one side or layer 30 of film 10 due to the angular displacement of the film at zone B. Similarly, perforation line 14 now resides on the opposite film layer or face 32, as is best shown in FIG. 3, and cut 26 is now located along film edges 34 and 36, respectively. Edges 34 and 36 are not the original edges of the film 10 but those formed from displacing the film 90 degrees. As may be noted, original edges 20 and 22 are now located along the newly formed center line of film 10 as is denoted at 38 in FIG. 3.

At this point, if desired, apertures 40 and 42 can be cut through film faces 30 and 32 at region between perforation lines 12 and 14 to produce wicket bags. In other words, the apertures permit the bags to be mounted on a wicket or like device for automatic or semi-automatic dispensing of the bags. Alternately, such as in the production of sandwich bags, for example, the cutting of apertures 40 and 42 is normally deleted. In addition, seals 44 are formed intermittently across the width of film 10 at a region on each side of the area 46 defined between lines 12 and 14, and remote therefrom; and the film separated along the mid-region of each seal 44 into sections 48, each identical to that shown in FIG. 4. Sections 48 are separable into individual lip bags by controllably tearing the same apart along perforation lines 12 and 14, respectively, whereby each section is manufactured into two lip bags of like construction, as is shown by bag 50 in FIG. 5.

Alternatively, if desired, the step of separating the film along perforation lines 12 and 14 can precede or even might accompany the step of cutting film 10 apart along the mid-region of seals 44. In any event, seals 44 are optimally formed by a heated wire or the like which simultaneously seals and cuts the film apart.

Referring now of FIG. 5, bags 50 each comprise opposed front and rear walls 52 and 54, respectively, corresponding to layers 30 and 32 of film 10. Walls 52 and 54 are integrally joined together along the opposite sides of bag 50 by folds 56 and 58; and across the bottom of the bag by seal 44. An offset lip portion 60 including apertures 40 and 42 is located at the top end of bag 10 integral with rear wall 54, and is of a height dimension equal to the offset spacing $x$ between perforation lines 12 and 14.

Referring now to FIG. 6, a modified embodiment of the invention is shown wherein tubular film 10a is cut or otherwise weakened along lines 12a and 14a which extend inwardly from edges 20a and 22a of the film; but terminated short of the film center line 24a a distance of $x/2$. Thereafter, and by steps common to the process explained above, for example, film 10a is displaced an angular distance of 90 degrees and intermittently sealed at 44a, thereby forming sections 48a (see FIG. 7). In addition, apertures 40a and 42a are alternately cut between lines 12a and 14a, depending on the bag end use. Each section 48a can be separated into two bags by removing material from between lines 12a and 14a to a depth of $x/2$ as is denoted in FIG. 8 by cutouts 62 and 64, respectively. The resultant bag 50a construction is illustrated in FIG. 9, and is similar to bags 50 except that its offset lip portion 60a is of somewhat less than bag width due to the provision of the cutouts 62 and 64. Nevertheless, bag 50a provides a suitable offset lip for mounting on a wicket device, for example. Moreover, the addition of cutouts 62 and 64 does not lessen the number of bags 50a that can be manufactured from a discrete length of film 10a since the required bag length is not effected by the cutouts. Thus, the manufacture of bags 50a is made for all purposes scrapless by utilizing the principles disclosed herein.

In carrying forth the practice of the present invention, lines 12, 14, 26 and, in addition, lines 12a and 14a can comprise lines of weakness such as can be formed by cutting or perforating or by thinning the film, for example. However, one region of the film desirably remains intact such that the film is readily forwarded to zones B and C, whereby bags 50 and 50a can be manufactured continuously and without resulting production of uneconomical scrap material.

Desirably the sealing and cutting steps preformed at zone C occur in the same cycle or time space such that the bag production rate is maximized. Separations required such as along perforation lines 12 and 14 can be accomplished, for example, by fast feed-off means or the like, or manually accomplished. Alternatively, such as for sandwich bags, section 48 can be left intact for later separation by the user, thus, better protecting the interior of the bag from contamination. Also, if desired, bags 50 and 50a can be constructed utilizing additional steps such as would be required to form a conventional gusset structure along the opposite sides, respectively, of such bags.

While certain representative embodiments and details have been shown for the purpose of illustrating the invention, it will be apparent to those skilled in the art that various changes and modifications can be made therein without departing from the spirit and scope of the invention. For example, lines 12 and 14 can be made to extend not from the edge of the film, but from the mid-regions thereof and the film rotated displaced more or less than 90 degrees, as is required to place the lines on film faces 30 and 32, respectively. The broad concept of the invention, therefore, is intended to include such minor deviations from the particularly described preferred embodiments thereof while still obtaining the benefits of the invention.

What is claimed is:

1. A method of forming lip bags from continuous lengths of tubular material comprising the steps of:
    (a) weakening the material along first and second lines of weakness extending generally transversely to the length of the material and offset from each other, said lines of weakness extending through both layers of the material;
    (b) angularly displacing the material a sufficient amount such that said first line of weakness resides on one layer of the material and said second line of weakness resides on the opposite layer;
    (c) joining said layers together at a region on each side of the area defined between said first and second lines of weakness, and remote therefrom, said joined regions extending generally in a direction transversely to the length of the material; and (d) separating the material along the mid-region of said joined region and along said first and second lines of weakness to form lip bags.

2. The method of claim 1 wherein said first and second lines of weakness extend inwardly from adjacent the opposite edges of said material and terminate near the center line of the material, said method including the additional step of weakening both layers of the material in a region near the center line and between said first and second lines, said displacement step comprising displacing the material approximately 90 degrees.

3. The method of claim 2 wherein said first and second lines of weakness comprise perforations.

4. The method of claim 2 wherein said first and second lines of weakness comprise cuts.

5. The method of claim 2 wherein said first and second lines of weakness are formed by thinning the material.

6. The method of claim 1 wherein at least one aperture is formed through both layers of the material in the region between said first and second lines of weakness.

7. The method of claim 1 wherein said first and second lines of weakness extend inwardly from adjacent the opposite edges of the material, respectively, but terminate short of the imaginary center line thereof, said method including the step, following the step of displacing the material, of removing portions of the material along the edges thereof and in the area defined between said first and second lines of weakness.

8. The method of claim 7 wherein said displacing stem comprises angularly displacing the material 90 degrees.

9. The method of claim 8 wherein said first and second lines of weakness comprise cuts.

10. The method of claim 9 wherein said removing step comprises removing said portions of material to a sufficient depth to separate the material along said first and second lines of weakness.

References Cited
UNITED STATES PATENTS

| | | | |
|---|---|---|---|
| 2,651,364 | 9/1953 | Ashman | 93—35RX |
| 3,254,574 | 6/1966 | Becker | 93—35R |
| 3,334,552 | 8/1967 | Kugler | 93—35R |

BERNARD STICKNEY, Primary Examiner

U.S. Cl. X.R.

229—53